US012592566B2

(12) United States Patent
Inagaki et al.

(10) Patent No.: US 12,592,566 B2
(45) Date of Patent: Mar. 31, 2026

(54) DIRECT CURRENT CIRCUIT BREAKER

(71) Applicant: Mitsubishi Electric Corporation, Tokyo (JP)

(72) Inventors: Takashi Inagaki, Tokyo (JP); Sho Tokoyoda, Tokyo (JP); Kenji Kamei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 18/576,148

(22) PCT Filed: Sep. 27, 2021

(86) PCT No.: PCT/JP2021/035221
§ 371 (c)(1),
(2) Date: Jan. 3, 2024

(87) PCT Pub. No.: WO2023/047556
PCT Pub. Date: Mar. 30, 2023

(65) Prior Publication Data
US 2024/0313543 A1     Sep. 19, 2024

(51) Int. Cl.
*H02J 3/36*          (2006.01)
(52) U.S. Cl.
CPC ..................................... *H02J 3/36* (2013.01)
(58) Field of Classification Search
CPC ....................................................... H02J 3/36
See application file for complete search history.

(56) References Cited

U.S. PATENT DOCUMENTS 5,517,378 A * 5/1996 Asplund .............. H01H 33/596
361/4
11,798,763 B2 10/2023 Grieshaber et al.
(Continued)

FOREIGN PATENT DOCUMENTS

EP          3276648 A1     1/2018
EP          3306635 A1     4/2018
(Continued)

OTHER PUBLICATIONS

International Search Report (PCT/ISA/210) with translation and Written Opinion (PCT/ISA/237) mailed on Nov. 30, 2021, by the Japanese Patent Office as the International Searching Authority for International Application No. PCT/JP2021/035221. (9 pages).
(Continued)

*Primary Examiner* — Carlos Amaya
(74) *Attorney, Agent, or Firm* — .Buchanan Ingersoll & Rooney PC

(57)          ABSTRACT
A direct current circuit breaker includes a first breaking unit and a second breaking unit. The first breaking unit includes: a first circuit breaker inserted in a direct current line; and a resonance circuit unit that generates a resonance current. The first breaking unit forms a current zero point by superimposing the resonance current on a direct current flowing through the direct current line, and breaks the direct current by opening the first circuit breaker. The second breaking unit includes a semiconductor element, allows the direct current to flow when energization of the semiconductor element is ON, and breaks the direct current by switching energization of the semiconductor element from ON to OFF.

6 Claims, 5 Drawing Sheets

(56) References Cited

U.S. PATENT DOCUMENTS

| | | | |
|---|---|---|---|
| 2021/0134544 | A1 | 5/2021 | Inagaki et al. |
| 2022/0165524 | A1 | 5/2022 | Grieshaber et al. |

FOREIGN PATENT DOCUMENTS

| | | | |
|---|---|---|---|
| EP | 3309809 | A1 | 4/2018 |
| EP | 4068326 | A1 | 10/2022 |
| FR | 3094136 | A1 | 9/2020 |
| JP | S5834525 | A | 3/1983 |
| JP | 2016181383 | A | 10/2016 |
| JP | 2016225198 | A | 12/2016 |
| WO | 2019012609 | A1 | 1/2019 |
| WO | 2021106191 | A1 | 6/2021 |

OTHER PUBLICATIONS

Notice of Reasons for Refusal with translation dated May 10, 2023 issued by the Japanese Patent Office in corresponding Japanese Patent Application No. 2022-506705. (7 pages).
Extended European Search Report dated Oct. 31, 2024, issued in the corresponding European Patent Application No. 21958430.7, 7 pages.

* cited by examiner

DIRECT CURRENT CIRCUIT BREAKER

FIELD

The present disclosure relates to a direct current circuit breaker that breaks a direct current.

BACKGROUND

In a case of applying a direct current circuit breaker to multi-terminal high voltage direct current (HVDC) power transmission, it is required to break a direct current within a certain period of time when an accident such as a ground fault or a short circuit occurs in a system. In the multi-terminal HVDC system, when a DC system voltage falls below a threshold of a voltage that can be operated by a converter connecting an AC system and a DC system, the converter stops operation, which causes system collapse. Therefore, in order to maintain the operation of the system of the multi-terminal HVDC power transmission when an accident occurs, it is necessary to quickly break the direct current by using the direct current circuit breaker after the occurrence of the accident, to prevent the DC system voltage from falling below the threshold.

Unlike an alternating current, a direct current has no current zero point. Therefore, in order to break the direct current, a current zero point is forcibly formed between poles of a main circuit breaker. Patent Literature 1 discloses a direct current circuit breaker including: a main circuit breaker inserted in a direct current line; and a resonance circuit unit including a capacitor, a reactor, and a closing switch, in which the direct current circuit breaker forms a current zero point by superimposing a resonance current generated by the resonance circuit unit on a direct current, and breaks the direct current at the current zero point.

CITATION LIST

Patent Literature

Patent Literature 1: Japanese Patent Application Laid-open No. S58-34525

SUMMARY OF INVENTION

Problem to be Solved by the Invention

A direct current circuit breaker is desired to be capable of immediately closing a main circuit breaker in order to resume power transmission of a system after a direct current is broken, that is, capable of high-speed reclosing. Further, when an accident occurs again immediately after the reclosing, the direct current circuit breaker needs to immediately break the direct current. However, the conventional direct current circuit breaker disclosed in Patent Literature 1 has a problem that it is difficult to realize high-speed reclosing because there is a restriction that the capacitor must be charged in advance for breaking the direct current.

The present disclosure has been made in view of the above, and an object of the present disclosure is to obtain a direct current circuit breaker capable of realizing high-speed reclosing.

Means to Solve the Problem

In order to solve the above-described problem and achieve the object, a direct current circuit breaker according to the present disclosure includes a first breaking unit and a second breaking unit. The first breaking unit includes: a first circuit breaker inserted in a direct current line; and a resonance circuit unit that generates a resonance current. The first breaking unit forms a current zero point by superimposing the resonance current on a direct current flowing through the direct current line, and breaks the direct current by opening the first circuit breaker. The second breaking unit includes a semiconductor element. The second breaking unit allows the direct current to flow when energization of the semiconductor element is ON, and breaks the direct current by switching energization of the semiconductor element from ON to OFF.

Effects of the Invention

The direct current circuit breaker according to the present disclosure has an effect that high-speed reclosing can be realized.

BRIEF DESCRIPTION OF DRAWINGS

FIGS. 5(f)-5(j) are a second diagram for explaining transition of a state of the direct current circuit breaker according to the first embodiment.

DESCRIPTION OF EMBODIMENTS

Hereinafter, a direct current circuit breaker according to an embodiment will be described in detail with reference to the drawings.

First Embodiment

Figure 1:
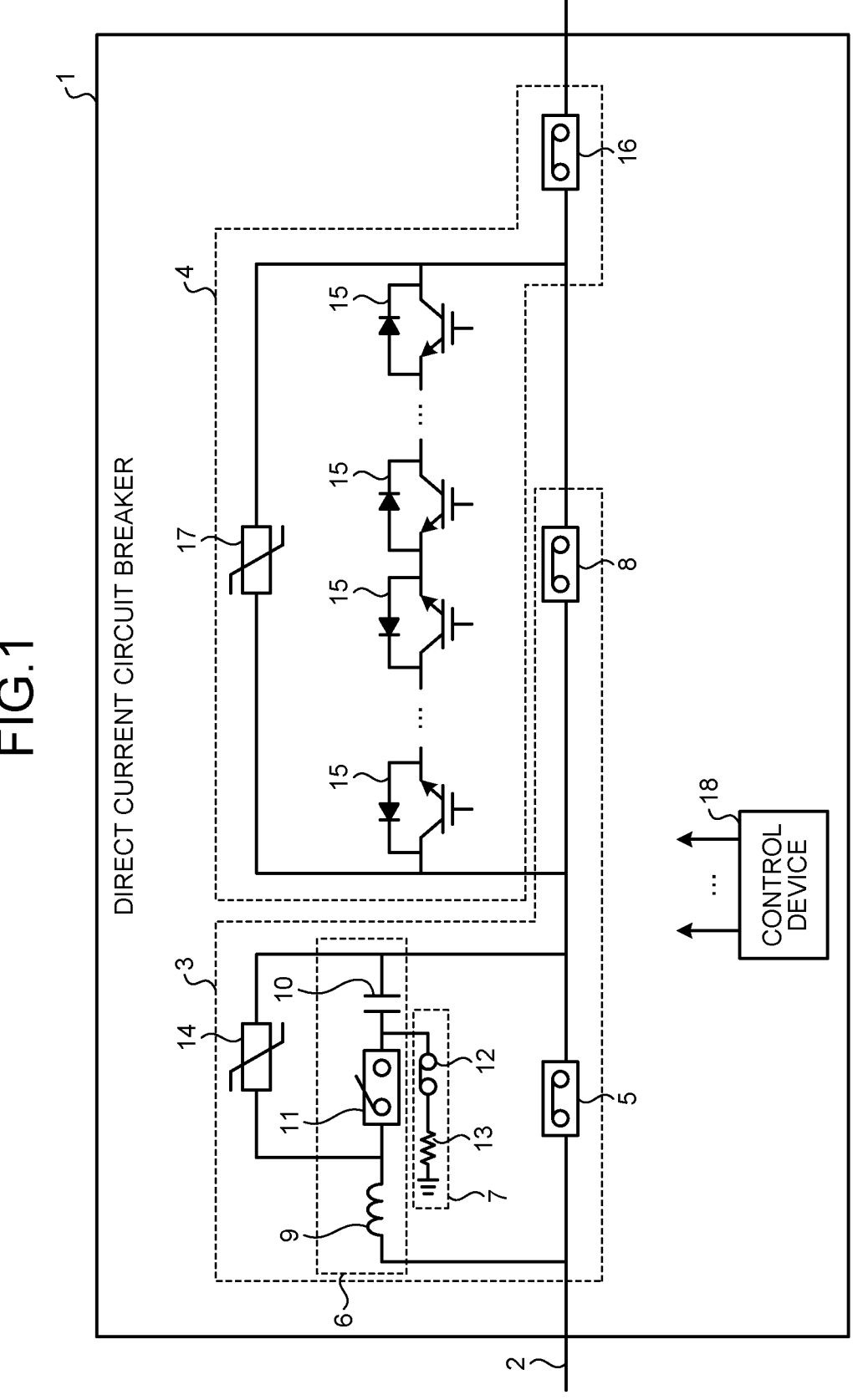
FIG. 1 is a diagram illustrating an example of a circuit configuration of a direct current circuit breaker according to a first embodiment.

FIG. 1 is a diagram illustrating an example of a circuit configuration of a direct current circuit breaker 1 according to a first embodiment. The direct current circuit breaker 1 is provided on a direct current line 2 of a power system. In the first embodiment, the power system is a power system that performs multi-terminal HVDC power transmission. The direct current circuit breaker 1 protects the power system by breaking a direct current when an accident such as a short circuit or a ground fault occurs in the direct current line 2.

The direct current circuit breaker 1 includes a first breaking unit 3, a second breaking unit 4, and a control device 18 that controls the entire direct current circuit breaker 1. The first breaking unit 3 is a mechanical direct current circuit breaker (DCCB). The second breaking unit 4 is a semiconductor circuit breaker.

The first breaking unit 3 includes a main circuit breaker 5 that is a first circuit breaker, a resonance circuit unit 6 that generates a resonance current, a charging circuit unit 7, an auxiliary circuit breaker 8 that is a second circuit breaker, and a surge arrester 14 that is a first energy processing unit. The resonance circuit unit 6 includes a reactor 9, a capacitor 10, and a closing switch 11. The charging circuit unit 7 includes a charging switch 12 and a charging resistor 13. The first breaking unit 3 forms a current zero point by superimposing the resonance current on a direct current flowing through the direct current line 2, and breaks the direct current by opening the main circuit breaker 5.

The main circuit breaker 5 is inserted in the direct current line 2. The main circuit breaker 5 breaks the direct current at the current zero point formed by the resonance current and the direct current canceling each other. That is, the main circuit breaker 5 breaks the direct current by a forced arc-extinguishing method. As the main circuit breaker 5, in order to enable high-speed breaking, a circuit breaker excellent in current breaking with a high frequency is exemplified as a candidate, which is, for example, a vacuum circuit breaker (VCB). The main circuit breaker 5 may be a circuit breaker other than the VCB, for example, a gas circuit breaker.

The reactor 9, the capacitor 10, and the closing switch 11 are connected in series with each other. The reactor 9, the capacitor 10, and the closing switch 11 are connected in parallel to the main circuit breaker 5. The reactor 9 and the capacitor 10 generate a resonance current by means of discharge of the capacitor 10. The closing switch 11 is a switch that performs closing for forming the current zero point.

The charging circuit unit 7 charges the capacitor 10 with a DC potential of the direct current line 2. The charging switch 12 and the charging resistor 13 are connected in series to each other. The charging resistor 13 is grounded. The surge arrester 14 is connected in parallel to the capacitor 10 and the closing switch 11. Note that the first breaking unit 3 is not limited to that for charging the capacitor 10 with the DC potential of the direct current line 2. The first breaking unit 3 may be one for charging the capacitor 10 with an external power supply or the like.

The surge arrester 14 processes energy remaining in the system after the main circuit breaker 5 breaks the direct current. The surge arrester 14 inhibits overvoltage to a voltage level based on a withstand voltage specification of the first breaking unit 3.

The auxiliary circuit breaker 8 is inserted in the direct current line 2. The auxiliary circuit breaker 8 is connected in series to the main circuit breaker 5. The auxiliary circuit breaker 8 breaks a residual current flowing via the surge arrester 14 after the main circuit breaker 5 breaks the direct current.

The second breaking unit 4 includes a plurality of semiconductor elements 15, an auxiliary circuit breaker 16 that is a third circuit breaker, and a surge arrester 17 that is a second energy processing unit. In the second breaking unit 4, a direct current flows when energization of each semiconductor element 15 is ON, and the direct current is broken by switching the energization of each semiconductor element 15 from ON to OFF.

The semiconductor elements 15 are connected in series to each other. The plurality of semiconductor elements 15 are connected in parallel to the auxiliary circuit breaker 8. Each semiconductor element 15 is, for example, an insulated gate bipolar transistor (IGBT). The number of semiconductor elements 15 included in the second breaking unit 4 is freely determined. The plurality of semiconductor elements 15 are disposed so as to be bidirectionally energized. That is, the plurality of semiconductor elements 15 include semiconductor elements 15 having different energization directions. Hereinafter, the plurality of semiconductor elements 15 are also referred to as a semiconductor element group.

The surge arrester 17 is connected in parallel to the plurality of semiconductor elements 15. The surge arrester 17 processes energy remaining in the system after the semiconductor element group breaks the direct current. The surge arrester 17 inhibits overvoltage to a voltage level based on a withstand voltage specification of the second breaking unit 4.

The auxiliary circuit breaker 16 is inserted in the direct current line 2. The auxiliary circuit breaker 16 is connected in series to the auxiliary circuit breaker 8. The auxiliary circuit breaker 16 breaks a residual current flowing via the surge arrester 17 after the semiconductor element group breaks the direct current.

The control device 18 controls opening and closing of each of the main circuit breaker 5, the auxiliary circuit breaker 8, the closing switch 11, the charging switch 12, and the auxiliary circuit breaker 16. In addition, the control device 18 controls switching ON and OFF of energization for each of the plurality of semiconductor elements 15 included in the second breaking unit 4.

Figure 2:
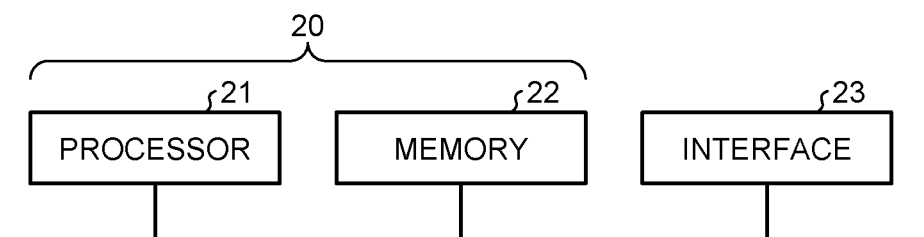
FIG. 2 is a diagram illustrating an example of a hardware configuration of a control device included in the direct current circuit breaker according to the first embodiment.

FIG. 2 is a diagram illustrating an example of a hardware configuration of the control device 18 included in the direct current circuit breaker 1 according to the first embodiment. FIG. 2 illustrates a hardware configuration in a case where the function of the control device 18 is implemented by using hardware that executes a program. Processing circuitry 20 illustrated in FIG. 2 includes a processor 21 and a memory 22. The processing circuitry 20 is also referred to as a control circuit. The function of the control device 18 is realized by using the processing circuitry 20. The processor 21, the memory 22, and an interface 23 are connected to each other via a bus.

The processor 21 is a central processing unit (CPU). The processor 21 may be a processing device, an arithmetic device, a microprocessor, a microcomputer, or a digital signal processor (DSP). The memory 22 corresponds to, for example, a nonvolatile or volatile semiconductor memory such as a random access memory (RAM), a read only memory (ROM), a flash memory, an erasable programmable read only memory (EPROM), or an electrically erasable programmable read-only memory (EEPROM) (registered trademark), a magnetic disk, a flexible disk, an optical disk, a compact disk, a mini disk, a digital versatile disc (DVD), or the like. The memory 22 stores a program for operating as the control device 18. The processing circuitry 20 implements the function of the control device 18 by the processor 21 reading and executing the program stored in the memory 22.

The interface 23 is an input/output circuit that is responsible for signal input and signal output. The interface 23 outputs a command to each of the main circuit breaker 5, the auxiliary circuit breaker 8, the closing switch 11, the charging switch 12, the semiconductor element 15, and the auxiliary circuit breaker 16. Further, a signal indicating that an accident current is detected is input to the interface 23 from an outside of the direct current circuit breaker 1. The accident current is a direct current that flows when an accident occurs.

The configuration illustrated in FIG. 2 is an example of hardware in a case where the function of the control device 18 is implemented by the general-purpose processor 21 and the memory 22, but the function of the control device 18 may be realized by dedicated processing circuitry instead of the processor 21 and the memory 22. The dedicated processing circuitry is a single circuit, a composite circuit, an application specific integrated circuit (ASIC), a field-programmable gate array (FPGA), or a combination of these. Note that a part of the function of the control device 18 may be realized by the processor 21 and the memory 22, and the rest may be realized by dedicated processing circuitry.

Figure 3:
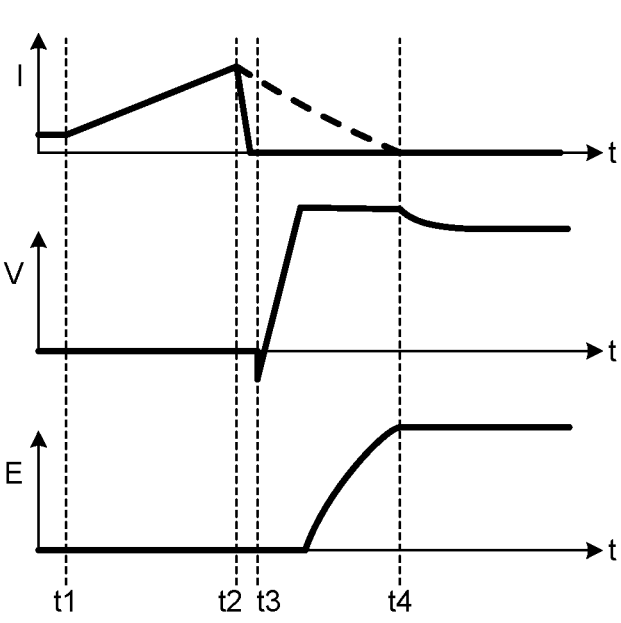
FIG. 3 is a view for explaining transition of a current and a voltage and energy processing in a first breaking unit included in the direct current circuit breaker according to the first embodiment.

FIG. 3 is a view for explaining transition of a current and a voltage and energy processing in the first breaking unit 3 included in the direct current circuit breaker 1 according to the first embodiment. FIG. 3 illustrates a graph indicating transition of a current I, a graph indicating transition of a voltage V, and a graph indicating transition of energy E. The current I is a current flowing between poles of the main circuit breaker 5. The voltage V is a voltage applied between the poles of the main circuit breaker 5. The energy E is energy processed by the surge arrester 14. In the graph indicating transition of the current I, a graph indicated by a broken line indicates transition of a residual current flowing through the surge arrester 14 and the auxiliary circuit breaker 8. A horizontal axis t of each graph represents time.

In normal time, the main circuit breaker 5, the auxiliary circuit breaker 8, and the auxiliary circuit breaker 16 are all closed, and a direct current flows through the direct current line 2. In the normal time, the closing switch 11 is open. After an accident occurs at time t1, an accident current larger than a current in the normal time flows through the direct current line 2, so that the current I increases. Unlike an energizing current in an AC system, an energizing current in a DC system does not periodically form a current zero point. Therefore, the direct current circuit breaker 1 needs to break a current by forming a current zero point by some method.

At time t2, the main circuit breaker 5 is opened and the closing switch 11 is closed. When the closing switch 11 is closed, the capacitor 10 and the reactor 9 generate a resonance current with discharge of the capacitor 10. When the resonance current flows through a loop including the reactor 9, the capacitor 10, the closing switch 11, and the main circuit breaker 5, the resonance current is superimposed on the accident current. When the resonance current in a direction opposite to a direction of the accident current is superimposed on the accident current, a current zero point is formed at time t3. In this way, the first breaking unit 3 forcibly breaks the accident current by forming the current zero point.

By forcibly breaking the accident current, electromagnetic energy expressed as $\frac{1}{2} \times LI^2$ remains in the system. It is assumed that the reference character "L" is an inductance and the reference character "I" is a current. The surge arrester 14 starts energy processing when the voltage V increases to a certain voltage value after time t3. The surge arrester 14 inhibits an increase in the voltage V by processing energy until time t4. In this way, the first breaking unit 3 inhibits overvoltage.

While the surge arrester 14 is processing energy, the residual current flows via the surge arrester 14. By opening the auxiliary circuit breaker 8 when the residual current reaches the current zero point, the auxiliary circuit breaker 8 breaks the residual current. As a result, the processing of the accident current by the first breaking unit 3 is completed.

When the first breaking unit 3 completes the processing of the accident current, the direct current circuit breaker 1 performs reclosing for resuming power transmission of the system. The direct current circuit breaker 1 performs reclosing by using the first breaking unit 3 and the second breaking unit 4. After the reclosing, the direct current circuit breaker 1 breaks an accident current by using the second breaking unit 4 when an accident occurs again during a period in which the capacitor 10 is being charged. Therefore, the direct current circuit breaker 1 can perform reclosing and breaking of the accident current without waiting for completion of charging of the capacitor 10.

Figures 4A, 4B, 4C, 4D, 4E:
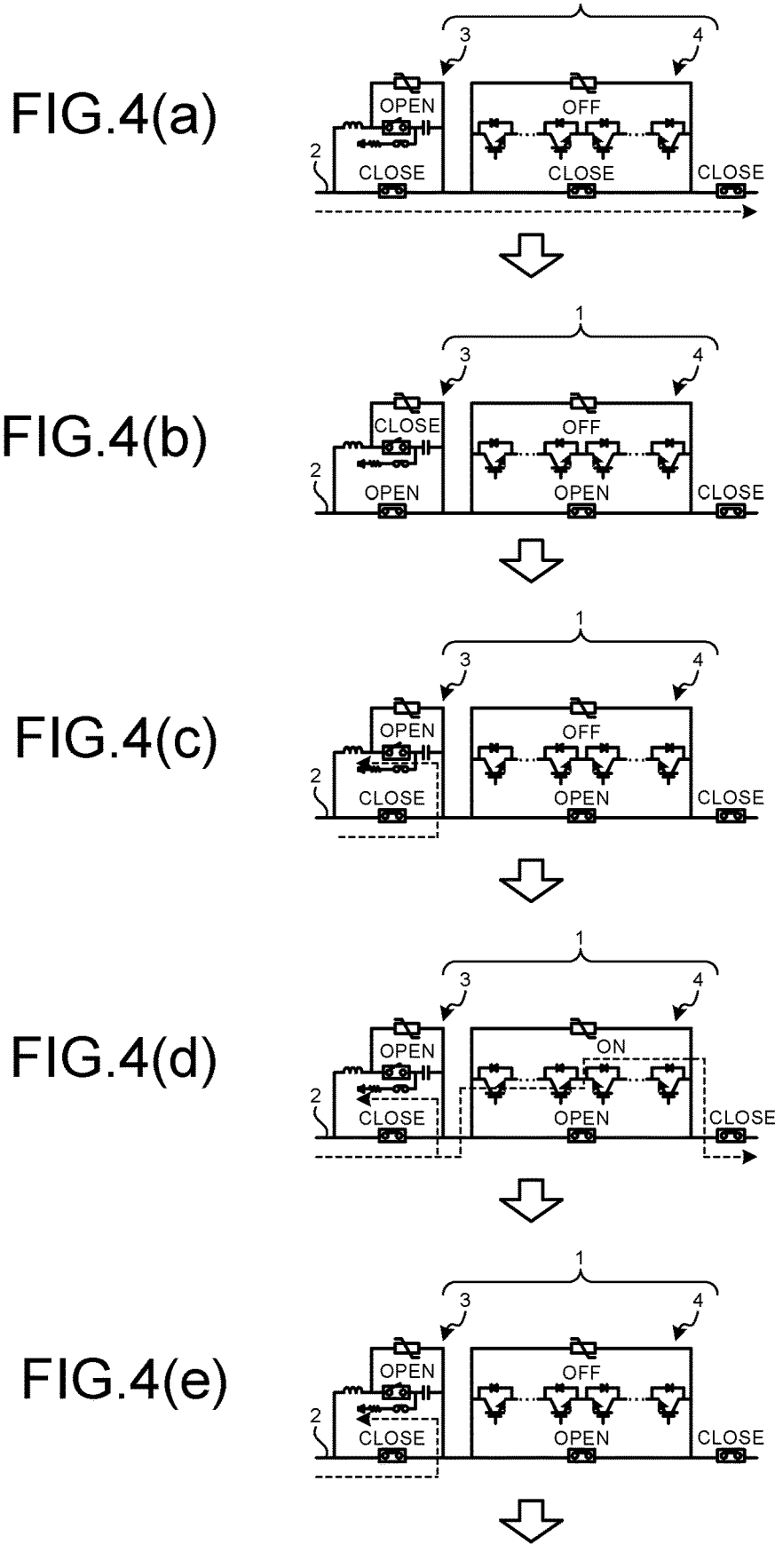
FIGS. 4(a)-4(e) are a first diagram for explaining transition of a state of the direct current circuit breaker according to the first embodiment.
Figures 5F, 5G, 5H, 5I, 5J:
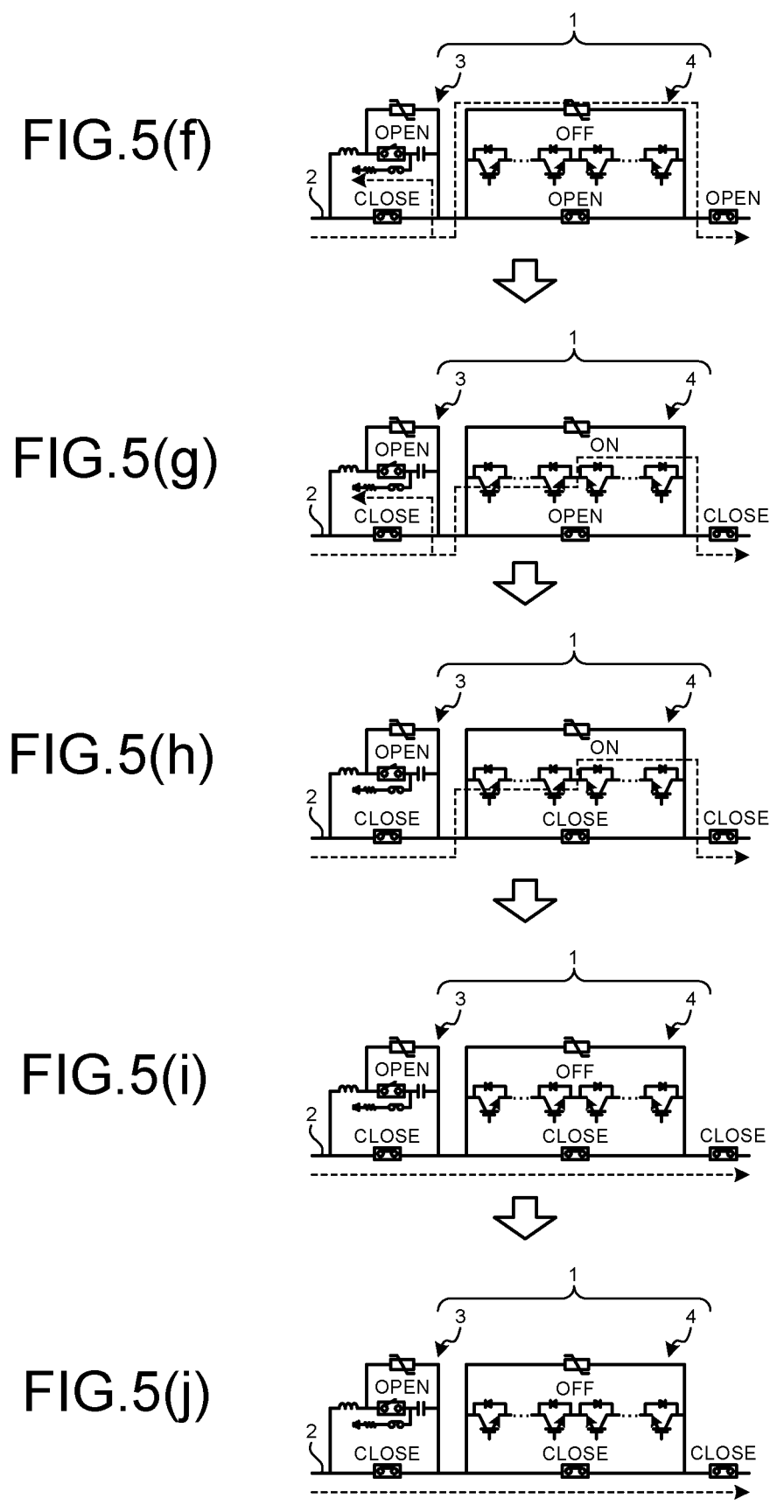
Figure 6:
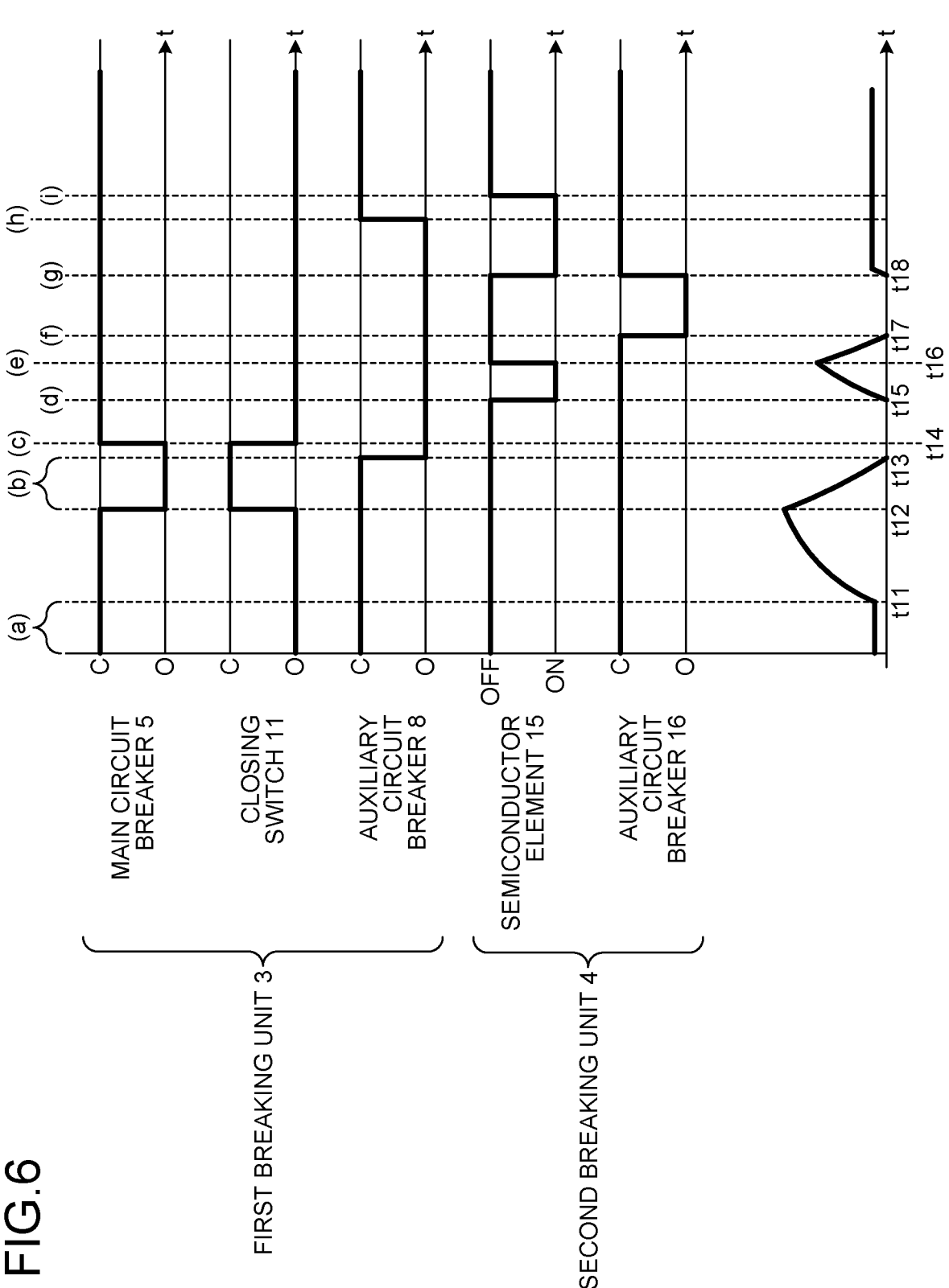
FIG. 6 is a timing chart illustrating an operation of the direct current circuit breaker according to the first embodiment.

Next, an operation of the direct current circuit breaker 1 will be described. FIG. 4 is a first diagram for explaining transition of a state of the direct current circuit breaker 1 according to the first embodiment. FIG. 5 is a second diagram for explaining transition of a state of the direct current circuit breaker 1 according to the first embodiment. FIG. 6 is a timing chart illustrating an operation of the direct current circuit breaker 1 according to the first embodiment.

(a) to (j) illustrated in FIGS. 4 and 5 represent a state in which a state of the direct current circuit breaker 1 transitions until returning to a normal state through: breaking of the accident current by the first breaking unit 3; reclosing by the first breaking unit 3 and the second breaking unit 4; and breaking of the accident current by the second breaking unit 4. Broken arrows in FIGS. 4 and 5 represent paths of a current. The normal time is assumed to be time during which power transmission of the system is normally performed. The normal state is assumed to be a state of the direct current circuit breaker 1 in the normal time.

The timing chart illustrated in FIG. 6 illustrates individual states of the main circuit breaker 5, the closing switch 11, the auxiliary circuit breaker 8, the semiconductor element 15, and the auxiliary circuit breaker 16. Here, the state of the semiconductor element 15 refers to a state of each semiconductor element 15 of the semiconductor element group. In addition, a lower part of FIG. 6 illustrates a graph indicating transition of a current flowing through the direct current line 2. (a) to (i) illustrated in FIG. 6 correspond to (a) to (i) in FIGS. 4 and 5.

In the timing chart of FIG. 6, "O" represents breaking of an electric circuit, that is, pole-opening, and "C" represents pole-closing of the electric circuit. "O" does not mean a pole-opening signal of each of the main circuit breaker 5, the auxiliary circuit breaker 8, the closing switch 11 and the auxiliary circuit breaker 16. "C" does not mean a pole-closing signal of each of the main circuit breaker 5, the auxiliary circuit breaker 8, the closing switch 11, and the auxiliary circuit breaker 16. In the timing chart of FIG. 6, for the semiconductor element 15, "ON" represents a state in which energization is turned ON, and "OFF" represents a state in which energization is turned OFF. Each of the main circuit breaker 5, the auxiliary circuit breaker 8, the closing switch 11, the charging switch 12, and the auxiliary circuit breaker 16 performs an opening operation and a closing operation in response to a command from the control device 18. The semiconductor element 15 switches between ON and OFF of energization in response to a command from the control device 18. Note that, since the charging switch 12 is always closed, an operation of the charging switch 12 is not illustrated in FIG. 6.

(a) of FIG. 4 illustrates a state of the direct current circuit breaker 1 before time t11, that is, a state of the direct current circuit breaker 1 in the normal time. In the normal time, the main circuit breaker 5, the auxiliary circuit breaker 8, and the auxiliary circuit breaker 16 are all closed. In the normal time, the closing switch 11 is open. In the normal time, energization of the semiconductor element 15 is OFF.

Time t11 illustrated in FIG. 6 is assumed to be a time at which an accident occurs. From time t11, an accident current flows through the direct current line 2, so that a current flowing through the direct current line 2 increases. At time t12, the main circuit breaker 5 is opened and the closing switch 11 is closed. As a result, the direct current circuit breaker 1 enters a state illustrated in (b) of FIG. 4. As described with reference to FIG. 3, the first breaking unit 3 forms a current zero point by superimposing a resonance current on a direct current, and breaks the direct current by opening the main circuit breaker 5. At time t12, the direct current becomes 0, and the direct current is broken. When the auxiliary circuit breaker 8 is opened at time t13, the first breaking unit 3 breaks the residual current. As a result, accident processing by the first breaking unit 3 is completed.

At time t14, as illustrated in (c) of FIG. 4, when the main circuit breaker 5 is closed and the closing switch 11 is opened, the main circuit breaker 5 and the closing switch 11 of the first breaking unit 3 return to a state identical to that in the normal time. The auxiliary circuit breaker 8 remains in the open state. Since the first breaking unit 3 is connected to the direct current line 2 at time t14, the first breaking unit 3 starts charging the capacitor 10.

At time t15, as illustrated in (d) of FIG. 4, energization of the semiconductor element 15 is turned ON. When the auxiliary circuit breaker 8 is opened at time t13 when the main circuit breaker 5 breaks the direct current, and energization of the semiconductor element 15 is switched from OFF to ON at time t15 after the main circuit breaker 5 breaks the direct current, a path of the current passing through the direct current line 2 and the semiconductor element 15 is formed. In this way, the direct current circuit breaker 1 performs reclosing for resuming power transmission of the system. Since the direct current circuit breaker 1 can break the direct current by switching energization of the semiconductor element 15 from ON to OFF as described later, the direct current circuit breaker 1 can perform reclosing without waiting for completion of charging of the capacitor 10. The direct current circuit breaker 1 can shorten a period from time t13 when the accident current is broken to time t15 when reclosing is performed.

Here, it is assumed that an accident occurs again simultaneously with reclosing. That is, it is assumed that the reclosing fails. At time t16, as illustrated in (e) of FIG. 4, energization of the semiconductor element 15 is turned OFF. When energization of the semiconductor element 15 is turned OFF, the direct current becomes 0 at time t16, and the direct current is broken. As a result, the second breaking unit 4 breaks the accident current. In this way, the direct current circuit breaker 1 can break the accident current without waiting for completion of charging of the capacitor 10. Since the second breaking unit 4 breaks the accident current by switching energization of the semiconductor element 15 from ON to OFF, the second breaking unit 4 can break the accident current at a high speed as compared with a case of using a mechanical switch.

By breaking the accident current, overvoltage is applied to the system. As illustrated in (f) of FIG. 5, the residual current flows through the surge arrester 17. The surge arrester 17 processes energy similarly to the case of the surge arrester 14. In this way, the second breaking unit 4 inhibits overvoltage. When the auxiliary circuit breaker 16 is opened at time t17, the second breaking unit 4 breaks the residual current. As a result, the processing of the accident current by the second breaking unit 4 is completed.

When the second breaking unit 4 completes the processing of the accident current, the direct current circuit breaker 1 performs reclosing for resuming power transmission of the system. At time t18, as illustrated in (g) of FIG. 5, energization of the semiconductor element 15 is turned ON, and the auxiliary circuit breaker 16 is closed. As a result, the direct current circuit breaker 1 is brought into a state identical to (d) of FIG. 4. Since the direct current circuit breaker 1 performs reclosing by turning ON energization of the semiconductor element 15, the direct current circuit breaker 1 can perform the reclosing at a higher speed as compared with a case of using a mechanical switch. The direct current circuit breaker 1 can shorten a period from time t17 when the accident current is broken to time t18 when reclosing is performed.

The control device 18 checks full charge on the basis of a monitoring result of a charge voltage of the capacitor 10. When charging of the capacitor 10 is completed, the auxiliary circuit breaker 8 is closed as illustrated in (h) of FIG. 5. Since resistance of the auxiliary circuit breaker 8 in a closed state of the auxiliary circuit breaker 8 is smaller than ON-resistance of the semiconductor element 15, a path of the direct current is shifted from a path through the semiconductor element 15 to a path through the auxiliary circuit breaker 8. Thereafter, as illustrated in (i) of FIG. 5, energization of the semiconductor element 15 is turned OFF. As a result, as illustrated in (j) of FIG. 5, the direct current circuit breaker 1 returns to the normal state. Note that, when no accident occurs between reclosing of the circuit illustrated in (d) of FIG. 4 and completion of charging of the capacitor 10, the direct current circuit breaker 1 transitions directly from the state illustrated in (d) of FIG. 4 to the state illustrated in (h) of FIG. 5.

The direct current circuit breaker 1 can perform reclosing after breaking by the first breaking unit 3 and before completion of the charging of the capacitor 10. As a result, the direct current circuit breaker 1 can easily realize high-speed reclosing as compared with a case where the capacitor 10 needs to be charged for reclosing.

At a time of breaking an accident current again due to a failure of reclosing, the direct current circuit breaker 1 breaks the accident current by turning OFF energization of the semiconductor element 15, so that the accident current can be broken at a high speed as compared with a case of using a mechanical switch. In addition, since the direct current circuit breaker 1 performs reclosing by turning ON energization of the semiconductor element 15 after breaking of the accident current, the direct current circuit breaker 1 can perform the reclosing at a high speed as compared with a case of using a mechanical switch. As a result, the direct current circuit breaker 1 can realize high-speed reclosing.

Note that the direct current circuit breaker 1 repeats the state transition from (e) of FIG. 4 to (g) of FIG. 5 when an accident occurs again at the time of reclosing after the second breaking unit 4 completes the accident processing. The direct current circuit breaker 1 can repeatedly perform high-speed breaking of the accident current and high-speed reclosing, by repeating the state transition from (e) of FIG. 4 to (g) of FIG. 5. Note that, the direct current circuit breaker 1 may stop the repetition of the reclosing when the number of times the reclosing has failed continuously exceeds a preset upper limit value.

Since the accident current breaking by the second breaking unit 4 can be made faster than the accident current breaking by the first breaking unit 3, the accident current at the time of breaking by the second breaking unit 4 is smaller than the accident current at the time of breaking by the first breaking unit 3. That is, as illustrated in FIG. 6, a current waveform from an occurrence of an accident to formation of a current zero point is smaller when the second breaking unit 4 breaks the accident current than when the first breaking unit 3 breaks the accident current. Therefore, energy processed by the surge arrester 17 of the second breaking unit 4 is smaller than energy processed by the surge arrester 14 of the first breaking unit 3. For the second breaking unit 4, the surge arrester 17 having smaller processable energy than the surge arrester 14 can be used. As a result, the direct current circuit breaker 1 can use the surge arrester 17 that is small and highly reliable, for the second breaking unit 4.

For a direct current circuit breaker used for HVDC power transmission, an industrial standard related to high-speed reclosing is not defined at present. Whereas, in an alternating current circuit breaker, a period of time from breaking of a direct current to closing is defined by the name of "Dead Time" in IEC 62271-100, which is a standard of the International Electrotechnical Commission (IEC). An example of a typical value of the Dead Time is 300 ms. That is, a conventional alternating current circuit breaker is required to perform high-speed reclosing in about 300 ms. Since the conventional alternating current circuit breaker is required to operate at a high speed of about 300 ms for high-speed reclosing, a direct current circuit breaker used for HVDC power transmission may also be required to similarly operate at a high speed.

As described above, the direct current circuit breaker 1 according to the first embodiment can shorten a period from time t13 when an accident current is broken to time t15 when reclosing is performed. In addition, the direct current circuit breaker 1 can shorten a period from time t17 when an accident current is broken to time t18 when reclosing is performed. As a result, the direct current circuit breaker 1 can easily realize high-speed reclosing equivalent to the high-speed reclosing required for the alternating current circuit breaker.

According to the first embodiment, the direct current circuit breaker 1 includes: the first breaking unit 3 that forms a current zero point by superimposing a resonance current on a direct current and breaks the direct current by opening the main circuit breaker 5; and the second breaking unit 4 including the semiconductor element 15. In the second breaking unit 4, a direct current flows when energization of the semiconductor element 15 is ON, and the direct current is broken by switching energization of the semiconductor element 15 from ON to OFF. The direct current circuit breaker 1 switches between ON and OFF of energization of the semiconductor element 15, so that reclosing and breaking of the accident current can be performed before completion of charging for generating the resonance current. In addition, the direct current circuit breaker 1 can perform reclosing at high speed after breaking of the accident current. As described above, the direct current circuit breaker 1 can achieve a high-speed reclosing effect.

The configuration described in the above embodiment is an example of the contents of the present disclosure. The configuration of the embodiment can be combined with another known technique. A part of the configuration of the embodiment can be omitted or changed without departing from the gist of the present disclosure.

REFERENCE SIGNS LIST 1 direct current circuit breaker; 2 direct current line; 3 first breaking unit; 4 second breaking unit; 5 main circuit breaker; 6 resonance circuit unit; 7 charging circuit unit; 8, 16 auxiliary circuit breaker; 9 reactor; 10 capacitor; 11 closing switch; 12 charging switch; 13 charging resistor; 14, 17 surge arrester; 15 semiconductor element; 18 control device; 20 processing circuitry; 21 processor; 22 memory; 23 interface.

The invention claimed is:

1. A direct current circuit breaker comprising:
first breaking circuitry including a first circuit breaker inserted in a direct current line and a resonance circuitry to generate a resonance current, and configured to form a current zero point by superimposing the resonance current on a direct current flowing through the direct current line, and break the direct current by opening the first circuit breaker; and
second breaking circuitry including a semiconductor element connected in series to the first circuit breaker, and configured to allow the direct current to flow when energization of the semiconductor element is ON, and break the direct current by switching energization of the semiconductor element from ON to OFF, wherein
the first circuit breaker is connected in parallel to the resonance circuitry to form a first parallel connection body in which the first circuit breaker and the resonance circuitry are connected in parallel to each other,
the first breaking circuitry include a second circuit breaker inserted in the direct current line and connected in series to each of the first circuit breaker and the resonance circuitry, and
the semiconductor element is connected in parallel to the second circuit breaker to form a second parallel connection body in which the semiconductor element and the second circuit breaker are connected in parallel to each other,
the first parallel connection body and the second parallel connection body are connected in series to each other.

2. The direct current circuit breaker according to claim 1, wherein
the second circuit breaker is opened when the first circuit breaker breaks the direct current, and
energization of the semiconductor element is switched from OFF to ON after the first circuit breaker breaks the direct current.

3. The direct current circuit breaker according to claim 1, wherein
the resonance circuitry includes a capacitor and a reactor connected in parallel to the first circuit breaker, and the capacitor and the reactor generate the resonance current by means of discharge of the capacitor, and
after the capacitor is completely charged after the first circuit breaker breaks the direct current, the second circuit breaker is closed, and energization of the semiconductor element is switched from ON to OFF.

4. The direct current circuit breaker according to claim 3, wherein
the first breaking circuitry includes a first energy processing circuitry to inhibit overvoltage, the first energy processing circuitry being connected in parallel to the capacitor, and
the second breaking circuitry includes a second energy processing circuitry to inhibit overvoltage, the second energy processing circuitry being connected in parallel to the semiconductor element.

5. The direct current circuit breaker according to claim 2, wherein
the resonance circuitry includes a capacitor and a reactor connected in parallel to the first circuit breaker, and the capacitor and the reactor generate the resonance current by means of discharge of the capacitor, and
after the capacitor is completely charged after the first circuit breaker breaks the direct current, the second circuit breaker is closed, and energization of the semiconductor element is switched from ON to OFF.

6. The direct current circuit breaker according to claim 5, wherein the first breaking circuitry includes a first energy processing circuitry to inhibit overvoltage, the first energy processing circuitry being connected in parallel to the capacitor, and the second breaking circuitry includes a second energy processing circuitry to inhibit overvoltage, the second energy processing circuitry being connected in parallel to the semiconductor element.

* * * * *